US012730812B2

(12) United States Patent
Horn

(10) Patent No.: US 12,730,812 B2
(45) Date of Patent: Sep. 8, 2026

(54) REORDERING PREDICATES FOR DISJUNCTION OF CONJUNCTIONS DATABASE QUERIES

(71) Applicant: SAP SE, Walldorf (DE)

(72) Inventor: Oliver Horn, Nussloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/745,366

(22) Filed: Jun. 17, 2024

(65) Prior Publication Data

US 2025/0384038 A1 Dec. 18, 2025

(51) Int. Cl.
*G06F 16/2453* (2019.01)

(52) U.S. Cl.
CPC .. *G06F 16/24545* (2019.01); *G06F 16/24549* (2019.01)

(58) Field of Classification Search
CPC .................... G06F 16/24545; G06F 16/24549
See application file for complete search history.

(56) References Cited

U.S. PATENT DOCUMENTS 6,865,567 B1 3/2005 Oommen et al.
11,016,973 B2 5/2021 Merker et al.
12,386,834 B1 8/2025 Horn
2002/0116357 A1 8/2002 Paulley
2004/0060007 A1 3/2004 Gottlob et al.
2008/0235181 A1 9/2008 Faunce et al.
2009/0182720 A1 7/2009 Cain et al.
2009/0299989 A1 12/2009 Zhang et al.
2011/0060731 A1 3/2011 Al-Omari et al.
2013/0159321 A1 6/2013 Bossman et al.
2014/0095475 A1 4/2014 Su et al.
2017/0249360 A1 8/2017 Alpers et al.
2018/0075105 A1* 3/2018 Chavan ................ G06F 16/221
2019/0378028 A1 12/2019 Chaudhuri et al.
2020/0320048 A1 10/2020 Horn et al.
2022/0050843 A1 2/2022 Hu et al.
2022/0382751 A1* 12/2022 Dhuse ................ G06F 16/2428

(Continued)

OTHER PUBLICATIONS

U.S. Appl. No. 18/745,393, Horn, Jun. 17, 2024.

(Continued)

*Primary Examiner* — Aleksandr Kerzhner
*Assistant Examiner* — Samuel C Sharpless, III
(74) *Attorney, Agent, or Firm* — Fish & Richardson P.C.

(57) ABSTRACT

The present disclosure involves systems, software, and computer implemented methods for reordering predicates for disjunction of conjunction database queries. One example method includes receiving a disjunction of conjunctions query including a set of parameter values. An estimated selectivity of each inner predicate of the disjunction of conjunctions query can be determined, based on the parameter values. Estimated selectivities of inner predicates of the disjunction of conjunctions query that reference a database column can be determined, to generate an aggregated estimated selectivity for the database column. An evaluation order for evaluating inner predicates for the disjunction of conjunctions query can be determined, based on aggregated estimated selectivities of respective database columns. The inner predicates are evaluated, during execution of the query, based on the evaluation order and the set of parameter values.

20 Claims, 4 Drawing Sheets

(56) References Cited

U.S. PATENT DOCUMENTS

2024/0020515 A1 1/2024 Zeighami et al.
2024/0134858 A1* 4/2024 Schieferstein .... G06F 16/24549
2025/0384039 A1 12/2025 Horn

OTHER PUBLICATIONS

U.S. Appl. No. 18/745,430, Horn, Jun. 17, 2024.
Final Office Action in U.S. Appl. No. 18/745,430, mailed on Jan. 7, 2026, 58 pages.
Extended European Search Report in European Appln. No. 25182918.0, mailed on Dec. 11, 2025, 9 pages.
Helmer et al., "Optimism and pessimism in database query optimisation." 2024 IEEE 18th International Conference on Semantic Computing (ICSC). IEEE, Feb. 2024, 8 pages.
Non-Final Office Action in U.S. Appl. No. 18/745,430, mailed on Aug. 14, 2025, 47 pages.

* cited by examiner

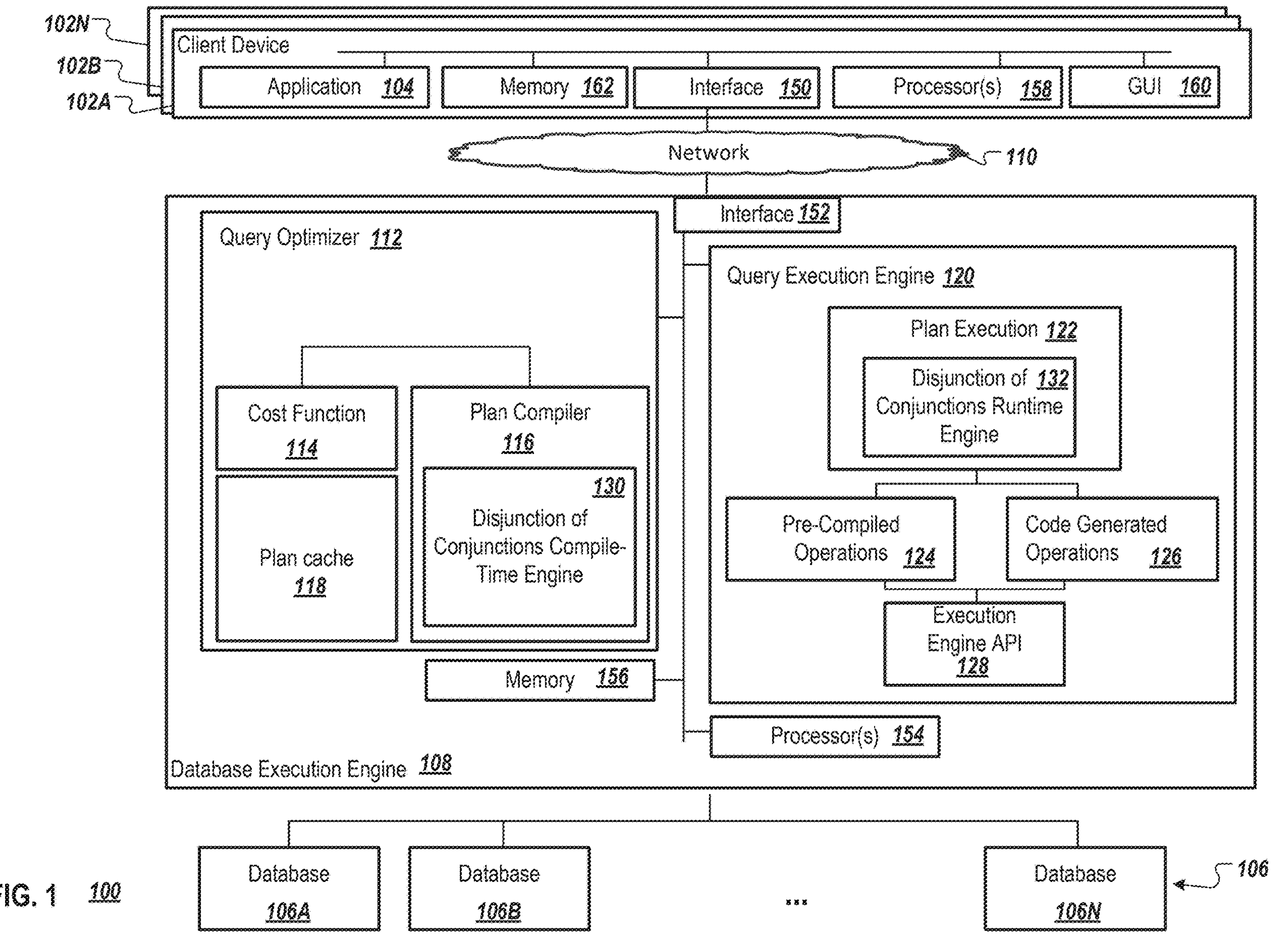
102N
102B
102A
Client Device
Application 104
Memory 162
Interface 150
Processor(s) 158
GUI 160
Network
110
Interface 152
Query Optimizer 112
Cost Function 114
Plan Compiler 116
Plan cache 118
130
Disjunction of Conjunctions Compile-Time Engine
Memory 156
Query Execution Engine 120
Plan Execution 122
Disjunction of 132 Conjunctions Runtime Engine
Pre-Compiled Operations 124
Code Generated Operations 126
Execution Engine API 128
Processor(s) 154
Database Execution Engine 108
Database 106A
Database 106B
...
Database 106N
106
FIG. 1
100

REORDERING PREDICATES FOR DISJUNCTION OF CONJUNCTIONS DATABASE QUERIES

TECHNICAL FIELD

The present disclosure relates to computer-implemented methods, software, and systems for reordering predicates for disjunction of conjunction database queries.

BACKGROUND

A database system can develop a query execution plan for a query. The query execution plan can represent a sequence of operations to access data in a database when executing the query. The database may also include a query plan optimizer to determine an efficient way to execute the query plan.

SUMMARY

The present disclosure involves systems, software, and computer implemented methods for reordering predicates for disjunction of conjunction database queries. An example method includes: receiving, at a database system, a query for a database table, wherein the query includes a set of parameter values; determining that the query corresponds to a disjunction of conjunctions query; identifying, by a runtime execution engine of the database system, from a pre-compiled query plan, a matrix for the disjunction of conjunctions query that includes a matrix row for each conjunction included in the query and a matrix column for each database column referenced in an inner predicate in a conjunction; estimating, for each database column and based on the set of parameter values, an estimated selectivity of each inner predicate of the disjunction of conjunctions query that references the database column; aggregating, for each database column, estimated selectivities of inner predicates of the disjunction of conjunctions query that reference the database column, to generate an aggregated estimated selectivity for the database column; determining, based on aggregated estimated selectivities of database columns, a matrix column evaluation order for evaluating inner predicates in the matrix for the disjunction of conjunctions query; and evaluating the disjunction of conjunctions query by evaluating the inner predicates in matrix columns of the matrix based on the matrix column evaluation order and the set of parameter values.

Implementations may include one or more of the following features. The disjunction of conjunctions query can correspond to a for-all-entries query. The disjunction of conjunctions query can include a combination of conjunction query expressions joined by multiple disjunction operators. The estimated selectivity of a first inner predicate can correspond to a percentage of table rows of the database table that are estimated to match the inner predicate. The estimated selectivity of a first inner predicate can be determined based on locating a first parameter value in frequency statistic metadata for the database table. The estimated selectivity of a first inner predicate can be determined based on sampling the database table and determining how many sampled rows of the database table match the inner predicate with respect to a first parameter value of the query. The estimated selectivity of a first inner predicate can determined by: determining that a column referenced in the inner predicate stores unique values; and determining the estimated selectivity of the inner predicate by dividing a value of one by a row count of the database table. The aggregated estimated selectivity for the database column can be a sum or a mean average of estimated selectivities of inner predicates of the disjunction of conjunctions query that reference the database column. Determining the matrix column evaluation order can include placing matrix columns that correspond to database columns with lower-valued aggregated estimated selectivities earlier in the matrix column evaluation order than matrix columns that correspond to database columns that have higher-valued aggregated estimated selectivities. Index information for the database table can be identified. Determining the matrix column evaluation order can include placing a first matrix column that corresponds to an indexed database column earlier in the matrix column evaluation order than a second matrix column that corresponds to a non-indexed database column, even though the indexed database column has a higher-valued aggregated estimated selectivity than the non-indexed database column.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 1 is a block diagram illustrating an example system for reordering predicates for disjunction of conjunction database queries.

DETAILED DESCRIPTION

Figure 2:
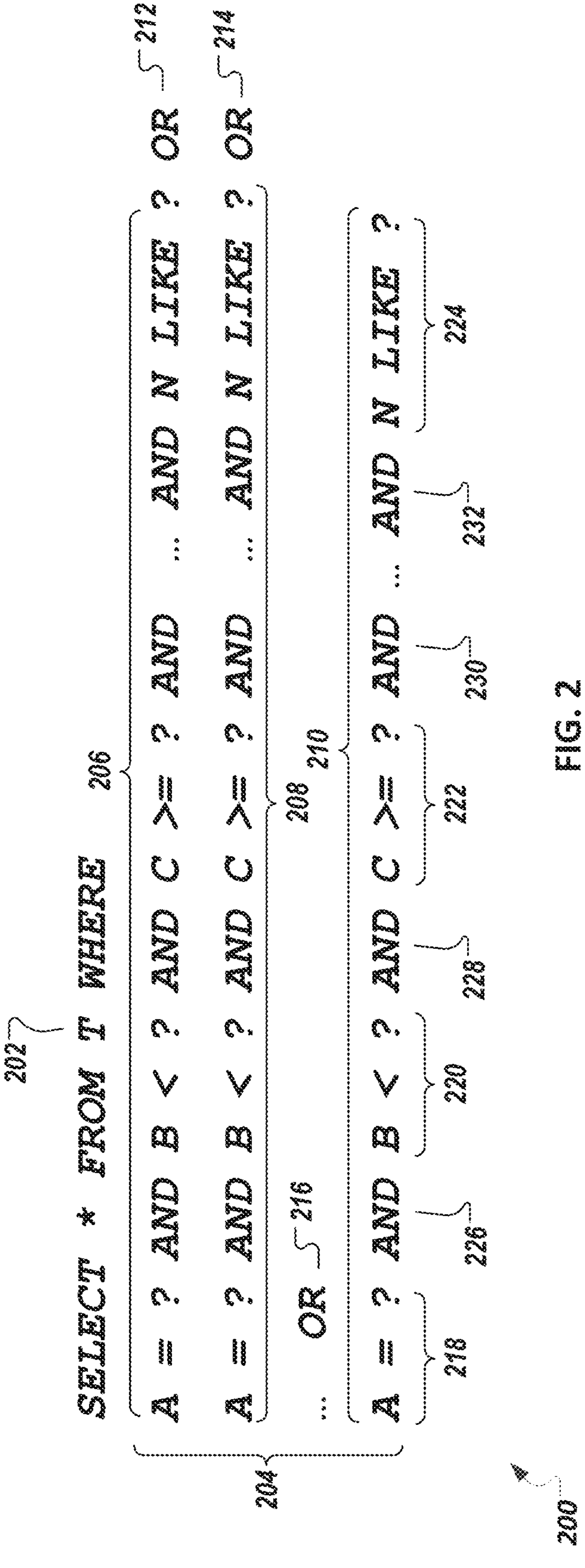
FIG. 2 illustrates a disjunction of conjunctions query.

A query plan for query generated by a query optimizer can include a recommended order of evaluating predicates included in the query. Some specialized queries can be complex, with multiple predicates. For example, some systems may support a “for all entries” query for filtering data in a database. The “for all entries” query can include multiple predicates in a recognizable structure such as a disjunction of multiple conjunctions. The query optimizer can detect the recognizable structure and generate a specialized predicate represented as one specialized operator rather than a complex operator tree with many operators. Processing the specialized operator can improve performance as compared to processing a complex operator tree. The specialized predicate can be represented as a matrix, as described below.

While the query optimizer can determine a compile-time order of evaluating inner predicates included in the matrix (e.g., based on estimated selectivities of inner predicates that are determined based on a first parameter set provided with the query), skewed data sets can cause a compile-time query plan to not work well with runtime parameters that result in substantially different actual inner predicate selectivities that differ from the estimated inner predicate selectivities that were determined at compile time. To avoid performance issues that can arise from such skewed data, a reordering of inner predicate evaluation can be determined at runtime, based on selectivity estimates that are determined at runtime based on actual parameter values. Such runtime adaptation can improve query performance for skewed data sets. For example, runtime adaptation can result in consumption of fewer computing resources as compared to query evaluation that would otherwise occur based on an original query plan. Further details are provided below.

FIG. 1 is a block diagram illustrating an example system 100 for reordering predicates for disjunction of conjunction database queries. Although shown separately, in some implementations, functionality of two or more systems may be provided by a single system. In some implementations, the functionality of one illustrated system or component may be provided by multiple systems or components, respectively.

The system 100 may include one or more client devices 102A-N. Each client device 102 may include a user interface, such as a browser or other application 104 to enable access to one or more applications, database layer(s), and/or databases, to generate queries to one or more databases 106A-N, and/or to receive responses to those queries.

In the example of FIG. 1, the databases 106A-N represent a database layer 106 of a database management system where data may be persisted and/or stored in a structured way, and where the data can be queried or operated on using operations including SQL (Structured Query Language) commands or other types of commands/instructions to provide reads, writes, and/or perform other operations. To illustrate by way of an example, client device 102A may send a query via a database execution engine 108 to the database layer 106, which may represent a persistence and/or storage layer where database tables may be stored and/or queried. The query may be sent over a network 110.

The database execution engine 108 may include a query optimizer 112, such as a SQL optimizer and/or another type of optimizer, to receive at least one query from a client device and generate a query plan (which may be optimized) for execution by the database execution engine 108. The query optimizer 112 may receive, for example, a request, such as a query, and then form or propose an optimized query plan. The query plan may be represented as a "query algebra" or "relational algebra."

For example, a query requesting operations of "SELECT Columns from Table A and Table B, and perform an INNER JOIN on Tables A and B" may represent a query processed by the query optimizer 112. There may be several ways of implementing execution of the query. Accordingly, a query plan generated by the query optimizer 112 may offer hints or propose an optimum query plan with respect to the execution time of an overall query. To optimize a query, the query optimizer 112 may obtain one or more costs for the different ways the execution of the query plan can be performed. The costs may be obtained from a cost function 114 which responds to the query optimizer 112 with the cost(s) for a given query plan (or portion thereof), where costs may be expressed in terms of execution time at the database layer 106, for example.

To compile a query plan, the query optimizer 112 may provide the query plan to a query plan compiler 116 to enable compilation of some, if not all, of the query plan. The query plan compiler 116 may compile query algebra into operations, such as program code and/or any other type of command, operation, object, or instruction. The program code may include pre-compiled code (which can be pre-compiled and stored, and then selected for certain operations in the query plan) and/or just-in-time code generated specifically for execution of the query plan. For example, the query plan compiler 116 may select pre-compiled code for a given operation as part of the optimization of the query plan, while for another operation in the query plan the plan compiler may allow a compiler to generate the code. The pre-compiled and generated code represent code for executing the query plan. Generated query plans can be stored in a query plan cache 118.

A query execution engine 120 may receive, from the query optimizer 112, compiled code to enable execution of the optimized query plan. The query execution engine 120 can forward the compiled code to a query plan execution engine 122. The query plan execution engine 122 can prepare the query plan for execution, where the query plan may include pre-compiled code 124 and/or generated code 126. When the code for the query plan is ready for execution during runtime, the query execution engine 120 may step through the code performing some of the operations within the database execution engine 108 and/or sending some of the operations (or commands in support of an operation, such as a read, write, and/or the like) to an execution engine application programming interface (API) 128 for execution at the database layer 106.

The database execution engine 108 can perform custom processing for certain types of queries such as disjunction of conjunctions queries. A disjunction of conjunction query can be a query that requests retrieval of information for all data entries associated with one or more parameters. Such queries may be referred to as "FOR ALL ENTRIES" (FAE) queries. In FAE queries, values for parts of a WHERE-clause of the query statement may be obtained from a table, where that table may have an arbitrary number of rows. For example, data in the table may have been obtained as a result of another query on a database. The FAE query may be used to reduce the number of database accesses by retrieving a block of entries instead of a single entry.

FIG. 2 illustrates a disjunction of conjunctions query 200. The query 200 selects all rows from a table T 202 subject to a WHERE clause 204 that represents a disjunction of conjunctions. The disjunction of conjunctions includes a collection of conjunctions including conjunctions 206, 208, and 210 (among others). The disjunction of conjunctions is a joining of the different junctions using OR operators such as OR operators 212, 214, and 216. A given conjunction, such as the conjunction 210, includes various sub-expressions/predicates (e.g., predicates 218, 220, 222, and 224 that are joined by AND operators (e.g., AND operators 226, 228, 230, and 232). In some implementations, the query 200 can be associated, for example, with a "FOR ALL ENTRIES" operation supported by a given database system. The predicates 218, 220, 222, and 224 in this example each include a parameter placeholder denoted by '?'. At runtime, each '?' item can be replaced with a respective parameter value provided with a query request.

Referring again to FIG. 1, a disjunction of conjunctions compile-time engine 130 can perform certain compile-time operations for disjunction of conjunctions queries. For example, the disjunction of conjunctions compile-time engine 130 can detect a disjunction of conjunctions structure (e.g., an FAE structure) in a query and generate a single predicate (e.g., an FAE-predicate) from the query that is represented as one operator, which can be more efficient with respect to query compilation and evaluation as compared to an extensive operator tree that includes a single operator per predicate included in a disjunction of conjunctions structure. For instance, a query such as the disjunction of conjunctions query 200 may include several thousand predicates.

The FAE-predicate can correspond to an FAE matrix that includes a row for each conjunction included in the FAE-predicate and a matrix column for each database column referenced in an inner predicate in a conjunction. For instance, with reference to FIG. 2, columns of the FAE-matrix can include different columns corresponding to the database columns "A", "B", "C", and "N" included in the predicates 218, 220, 222, and 224.

The disjunction of conjunctions compile-time engine 130 can determine an order for evaluation of the columns of the FAE-matrix. For example, the disjunction of conjunctions compile-time engine 130 can estimate selectivity of each predicate (e.g., based on parameter values of a first execution of the query) and determine an evaluation order of the columns of the FAE-predicate based on an aggregation of estimated selectivities of the predicates that reference a given database column. For instance, a database column A may be referenced in various inner predicates of the FAE-predicate, at runtime of a first execution of a query, such as in predicates like "A=5", "A=10", "A=100", etc. The disjunction of conjunctions compile-time engine 130 can determine an estimated selectivity of each of the "A=5", "A=10", "A=100", etc. predicates and determine an aggregated estimated selectivity for column A based on aggregating the respective estimated selectivities for column A. As another example, the database column B may be referenced in various inner predicates of the FAE-predicate, at runtime of the first execution of the query, such as in predicates like "B<10", "B<20", "B<50", etc. The disjunction of conjunctions compile-time engine 130 can determine an estimated selectivity of each of the "B<10", "B<20", "B<50", etc. predicates and determine an aggregated estimated selectivity for column B based on aggregating (e.g., summing) the respective estimated selectivities for column B.

As described in more detail below, the disjunction of conjunctions compile-time engine 130 can determine an estimated selectivity for a predicate using sampling or by evaluating metadata such as "top-k" value statistics per column which include the k most-frequent values in the column and their frequency.

The disjunction of conjunctions compile-time engine 130 can determine a column evaluation order of columns of the FAE-predicate based on the aggregated estimated selectivities. For example, columns that have smaller-valued aggregated estimated selectivities can be placed earlier in the column evaluation order than columns that have higher-valued aggregated estimated selectivities.

However, if the column evaluation order for the FAE-predicate is defined at compile time, situations can occur with a data set with a skewed data distribution where a pre-defined order specified in a cached query plan is not optimal at runtime for the data set if the cached query plan for the FAE-predicate is reused with parameter sets other than the parameter set used to generate the cached query plan. For example, a column evaluation order determined based on a first parameter set might be an order of columns A, C, B, N. But with the skewed data set, evaluation of FAE columns in that order might result in a severe performance degradation for some parameter sets for which, for example, column B has highest selectivity. Regarding performance degradation, even if just one row of the FAE-matrix includes a predicate on a column with a skewed data distribution, severe performance degradation can occur for the evaluation of the whole FAE-predicate.

To solve such performance issues that can arise by using a cached query plan, a disjunction of conjunctions runtime engine 132 can perform certain runtime operations for disjunction of conjunctions queries. For example, the disjunction of conjunctions runtime engine 132 can reorder the columns of an FAE-matrix at runtime based on real-time selectivity estimations of columns using actual current parameters during a current query execution. For example, the disjunction of conjunctions runtime engine 132 can perform similar generation of aggregated estimated selectivities for each column of the FAE matrix based on the current parameter values of the query, and determine a runtime column evaluation order for the FAE matrix based on the aggregated estimated selectivities calculated at runtime (e.g., with smaller-valued aggregated estimated selectivities placed earlier in the column evaluation order than columns that have higher-valued aggregated estimated selectivities). Accordingly, with such runtime column evaluation reordering for an FAE-predicate, the query plan execution engine 122 can have increased adaptivity for query plan execution. The query plan execution engine 122 can reuse but adapt a same query plan from the query plan cache 118 while reducing performance issues, since for every execution the FAE-predicate is optimized for a current parameter set.

As described in more detail below, the disjunction of conjunctions runtime engine 132 can also consider index information when determining whether to reorder columns of an FAE-predicate. For example, the disjunction of conjunctions runtime engine 132 can determine that even if a first column of an FAE-matrix which has index has a slightly worse aggregated selectivity than a second column that does not have an index, the first column should remain earlier in the column evaluation order, the second column might require a full scan.

The database layer 106 may be implemented using one or more data storage approaches, including disk storage and/or memory. Although shown as physically separate from the database execution engine 108, in some implementations, data of the database layer 106 may reside in memory 156 of the database execution engine 108 (and/or in memory of other systems or servers).

As used in the present disclosure, the term "computer" is intended to encompass any suitable processing device. The database execution engine 108 and the client devices 102 may each be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the database execution engine 108 and the client devices 102 may be adapted to execute any operating system, including Linux, UNIX, Windows, Mac OS®, Java™, Android™, iOS or any other suitable operating system.

Interfaces 150 and 152 are used by the client device 102A and the database execution engine 108, respectively, for communicating with other systems in a distributed environment—including within the system 100—connected to the network 110. Generally, the interfaces 150 and 152 each comprise logic encoded in software and/or hardware in a suitable combination and operable to communicate with the network 110. More specifically, the interfaces 150 and 152 may each comprise software supporting one or more communication protocols associated with communications such that the network 110 or interface's hardware is operable to communicate physical signals within and outside of the illustrated system 100.

The database execution engine 108 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the database execution engine 108. Specifically, each processor 154 executes the functionality required to receive and respond to requests from the client devices 102, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The database execution engine 108 includes the memory 156. In some implementations, the database execution engine 108 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the database execution engine 108. As mentioned, some or all of the data of the database layer 106 may reside in the memory 156 (and/or may reside in other memory and/or in disk storage of one or more systems).

The client devices 102A-N may each generally be any computing device operable to connect to or communicate with the database execution engine 108 via the network 110 using a wireline or wireless connection. In general, each client device 102A-N comprises an electronic computer device operable to receive, transmit, process, and store any appropriate data associated with the system 100 of FIG. 1. Each client device 102A-N can include one or more client applications, including the application 104. A client application is any type of application that allows the client device to request and view content on the client device. In some instances, a client application may be an agent or client-side version of the one or more enterprise applications running on an enterprise server (not shown).

Each client device 102A-N further includes one or more processors 158. Each processor 158 included may be a central processing unit (CPU), an application specific integrated circuit (ASIC), a field-programmable gate array (FPGA), or another suitable component. Generally, each processor 158 executes instructions and manipulates data to perform the operations of the respective client device. Specifically, each processor 158 included executes the functionality required to send requests to the database execution engine 108 and to receive and process responses from the database execution engine 108.

Each client device 102A-N is generally intended to encompass any client computing device such as a laptop/notebook computer, wireless data port, smart phone, personal data assistant (PDA), tablet computing device, one or more processors within these devices, or any other suitable processing device. For example, each client device 102A-N may comprise a computer that includes an input device, such as a keypad, touch screen, or other device that can accept user information, and an output device that conveys information associated with the operation of the database execution engine 108, or the client device itself, including digital data, visual information, or a GUI 160.

The GUI 160 of a client device 102 interfaces with at least a portion of the system 100 for any suitable purpose, including generating a visual representation of the application 104. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in each client device 102A-N may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device.

There may be any number of client devices 102A-N associated with, or external to, the system 100. Additionally, there may also be one or more additional client devices 102 external to the illustrated portion of system 100 that are capable of interacting with the system 100 via the network 110. Further, the term "client", "client device" and "user" may be used interchangeably as appropriate without departing from the scope of this disclosure. Moreover, while the client devices 102A-N are described in terms of being used by a single user, this disclosure contemplates that many users may use one computer, or that one user may use multiple computers.

Figure 3:
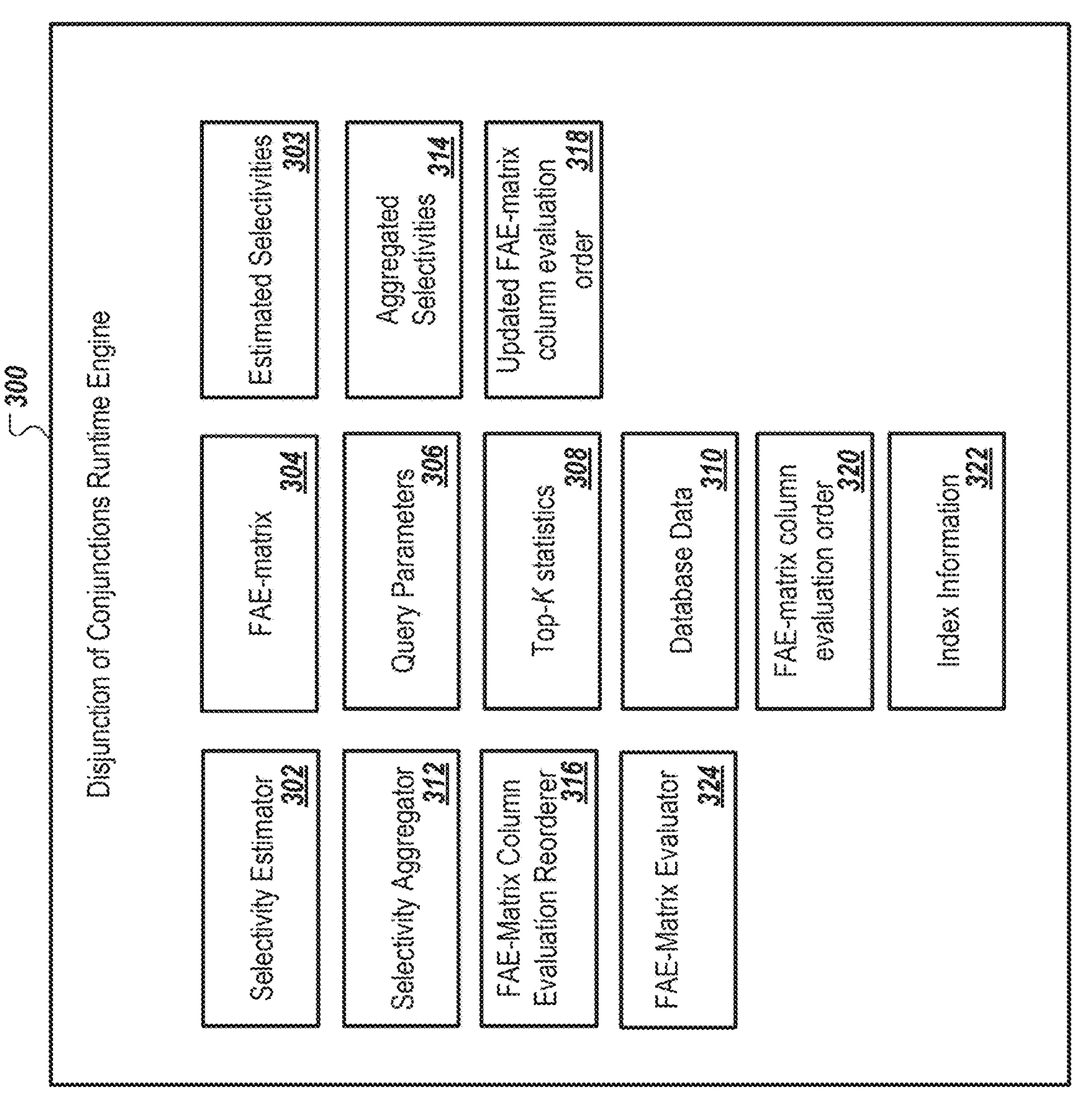
FIG. 3 is a block diagram illustrating an example disjunction of conjunctions runtime engine.

FIG. 3 illustrates an example disjunction of conjunctions runtime engine 300. The disjunction of conjunctions runtime engine 300 can be the disjunction of conjunctions runtime engine 132 of FIG. 1. A selectivity estimator 302 can generate estimated selectivities 303 of predicates of columns of an FAE-matrix 304 (e.g., where the FAE-matrix is one example of a representation of a disjunction of conjunctions) using values of query parameters 306 provided for a current query under execution.

For example, the selectivity estimator 302 can determine, for a predicate for a column in the FAE-matrix 304 and for a current parameter value of the predicate identified in the query parameters 306, whether top-K metadata statistics 308 includes an entry for the database column referenced in the predicate and the current parameter value. If the top-K metadata statistics 308 includes an entry for the database column and the current parameter value, the selectivity estimator 302 can identify, in the top-K metadata statistics 308, a frequency for the current parameter value in the database column and use the frequency as the estimated selectivity 303 for the predicate.

As another example, the selectivity estimator 302 can determine an estimated selectivity for a predicate using sampling (e.g., if the top-K metadata statistics 308 don't include information for estimating the selectivity of the predicate). For example, the selectivity estimator 302 can sample database data 310. For instance, suppose a predicate in the FAE-matrix is 'A=? ' for a table T and a current parameter value for the predicate is a value of one. Suppose also that the table T has one million rows. The selectivity estimator 302 can sample, for instance, one thousand rows from the table T and determine a frequency of the value of one in the column A of the table T. Suppose the selectivity estimator 302 identifies a total of 350 of the sampled rows that have a value of one for the column A. The selectivity estimator 302 in this example can determine an estimated selectivity 303 for the 'A=1' predicate as 0.35.

As yet another example, the selectivity estimator 302 can determine or identify that values in a given database column are unique and that, accordingly, a selectivity of an equals predicate that references the column is at most one. The selectivity estimator 302 can determine the estimated selectivity for the predicate by calculating a value of one divided by the row count of the table. As another example, the selectivity estimator 302 can estimate selectivity for an in-list predicate (e.g., "A IN (?, ?, ?)" when values in column A are unique, by calculating a value of a count of in-list elements divided by the row count of the table.

A selectivity aggregator 312 can aggregate multiple estimated selectivities of multiple predicates that include particular database columns, to obtain aggregated selectivities 314 for different database columns referenced in the FAE-matrix 304. For example, the selectivity aggregator can identify all estimated selectivities for column A in the estimated selectivities 303 and perform an aggregation operation (e.g., sum, average) on the estimated selectivities for column A to generate an aggregated selectivity for column A.

An FAE-matrix column evaluation reorderer 316 can generate an updated FAE-matrix column evaluation order 318, based at least on the aggregated selectivities 314. The updated FAE-matrix column evaluation order 318 may differ from an existing FAE-matrix column evaluation order 320 that may be associated with or included in a cached query plan, for example. For example, FAE-matrix column evaluation reorderer 316 can place columns that have smaller-valued aggregated estimated selectivities earlier in the updated FAE-matrix column evaluation order 318 than columns that have higher-valued aggregated estimated selectivities.

In some implementations, the FAE-matrix column evaluation reorderer 316 generate the updated FAE-matrix column evaluation order 318 based on index information 322 as well as the aggregated selectivities 314. For example, the FAE-matrix column reorderer can place, in the updated FAE-matrix column evaluation order 318, indexed columns that have an index in the index information 322 before columns that don't have indices, even if the indexed columns have lower aggregated selectivities 314 than columns without indices.

An FAE-matrix evaluator 324 can, as part of query processing by the disjunction of conjunctions runtime engine 300, evaluate the FAE-matrix 304 (or another disjunction of conjunctions structure), with respect to the query parameters 306, in the order specified by the updated FAE-matrix column evaluation order 318. Evaluating the FAE-matrix evaluator 324 and the query parameters 306 in the order specified by the updated FAE-matrix column evaluation order 318 can improve query performance, as mentioned above.

Figure 4:
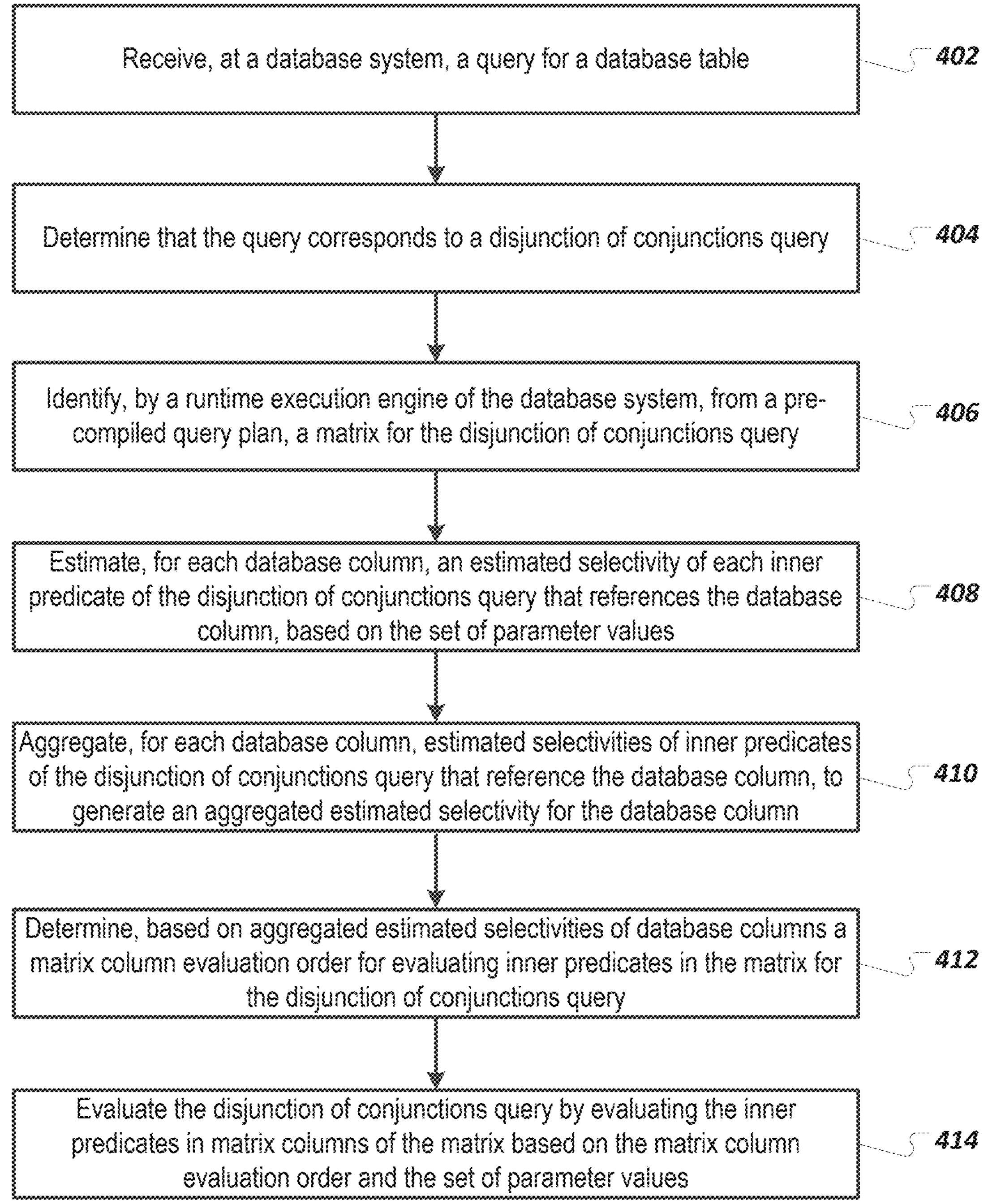
FIG. 4 is a flowchart of an example method for reordering predicates for disjunction of conjunction database queries.

FIG. 4 is a flowchart of an example method for reordering predicates for disjunction of conjunction database queries. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the disjunction of conjunctions runtime engine 132 of FIG. 1.

At 402, a query for a database table is received at a database system. The query includes a set of parameter values.

At 404, a determination is made that the query corresponds to a disjunction of conjunctions query. The disjunction of conjunctions query can correspond to a for-all-entries query. The disjunction of conjunctions query can include a combination of conjunction query expressions joined by multiple disjunction operators.

At 406, a runtime execution engine of the database system identifies, from a pre-compiled query plan, a matrix for the disjunction of conjunctions query that includes a matrix row for each conjunction included in the query and a matrix column for each database column referenced in an inner predicate in a conjunction.

At 408, for each database column, an estimated selectivity of each inner predicate of the disjunction of conjunctions query that references the database column is determined, based on the set of parameter values. The estimated selectivity of a given inner predicates can correspond to a percentage of table rows of the database table that are estimated to match the inner predicate. The estimated selectivity of a given inner predicate can be determined based on locating a parameter value of the set of parameter values in frequency statistic metadata for the database table. As another example, the estimated selectivity of a given inner predicate can be determined based on sampling the database table and determining how many sampled rows of the database table match the inner predicate with respect to a parameter value of the set of parameter values. As yet another example, the estimated selectivity of a first inner predicate can be determined by: determining that a column referenced in the inner predicate stores unique values; and determining the estimated selectivity of the inner predicate by dividing a value of one by a row count of the database table.

At 410, for each database column, estimated selectivities of inner predicates of the disjunction of conjunctions query that reference the database column are aggregated, to generate an aggregated estimated selectivity for the database column. The aggregated estimated selectivity for a database column can be a sum or a mean average of estimated selectivities of inner predicates of the disjunction of conjunctions query that reference the database column.

At 412, a matrix column evaluation order is determined for evaluating inner predicates in the matrix for the disjunction of conjunctions query. Determining the matrix column evaluation order can include placing matrix columns that correspond to database columns with lower-valued aggregated estimated selectivities earlier in the matrix column evaluation order than matrix columns that correspond to database columns that have higher-valued aggregated estimated selectivities. As another example, index information for the database table can be identified and determining the matrix column evaluation order includes placing a first matrix column that corresponds to an indexed database column earlier in the matrix column evaluation order than a second matrix column that corresponds to a non-indexed database column even though the indexed database column has a higher-valued aggregated estimated selectivity than the non-indexed database column.

At 414, the disjunction of conjunctions query is evaluated by evaluating the inner predicates in matrix columns of the matrix based on the matrix column evaluation order and the set of parameter values.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:

receiving, at a database system, a query for a database table, wherein the query includes a set of parameter values;

determining that the query corresponds to a disjunction of conjunctions query;

identifying, by a runtime execution engine of the database system, from a pre-compiled query plan, a matrix of the runtime execution engine that represents the disjunction of conjunctions query that includes a matrix row for each conjunction included in the query and a matrix column for each database column referenced in an inner predicate in a conjunction;

estimating, for each database column referenced in an inner predicate in a conjunction and based on the set of parameter values, an estimated selectivity of each inner predicate of the disjunction of conjunctions query that references the database column;

aggregating, for each database column referenced in an inner predicate in a conjunction, estimated selectivities of inner predicates of the disjunction of conjunctions query that reference the database column, to generate an aggregated estimated selectivity for the database column;

determining, based on aggregated estimated selectivities of database columns referenced in an inner predicate in a conjunction, a matrix column evaluation order for evaluating inner predicates in the matrix for the disjunction of conjunctions query; and evaluating the disjunction of conjunctions query by evaluating the inner predicates in matrix columns of the matrix based on the matrix column evaluation order and the set of parameter values.

2. The computer-implemented method of claim 1, wherein the disjunction of conjunctions query corresponds to a for-all-entries query.

3. The computer-implemented method of claim 1, wherein the disjunction of conjunctions query comprises a combination of conjunction query expressions joined by multiple disjunction operators.

4. The computer-implemented method of claim 1, wherein the estimated selectivity of a first inner predicate corresponds to a percentage of table rows of the database table that are estimated to match the inner predicate.

5. The computer-implemented method of claim 1, wherein the estimated selectivity of a first inner predicate is determined based on locating a first parameter value in frequency statistic metadata for the database table.

6. The computer-implemented method of claim 1, wherein the estimated selectivity of a first inner predicate is determined based on sampling the database table and determining how many sampled rows of the database table match the inner predicate with respect to a first parameter value of the query.

7. The computer-implemented method of claim 1, wherein the estimated selectivity of a first inner predicate is determined by:

determining that a column referenced in the inner predicate stores unique values; and determining the estimated selectivity of the inner predicate by dividing a value of one by a row count of the database table.

8. The computer-implemented method of claim 1, wherein the aggregated estimated selectivity for the database column is a sum or a mean average of estimated selectivities of inner predicates of the disjunction of conjunctions query that reference the database column.

9. The computer-implemented method of claim 1, wherein determining the matrix column evaluation order comprises placing matrix columns that correspond to database columns with lower-valued aggregated estimated selectivities earlier in the matrix column evaluation order than matrix columns that correspond to database columns that have higher-valued aggregated estimated selectivities.

10. The computer-implemented method of claim 1, further comprising:

identifying index information for the database table; and wherein determining the matrix column evaluation order comprises placing a first matrix column that corresponds to an indexed database column earlier in the matrix column evaluation order than a second matrix column that corresponds to a non-indexed database column, wherein the indexed database column has a higher-valued aggregated estimated selectivity than the non-indexed database column.

11. A system comprising:

one or more computers; and a computer-readable medium coupled to the one or more computers having instructions stored thereon which, when executed by the one or more computers, cause the one or more computers to perform operations comprising:

receiving, at a database system, a query for a database table, wherein the query includes a set of parameter values;

determining that the query corresponds to a disjunction of conjunctions query;

identifying, by a runtime execution engine of the database system, from a pre-compiled query plan, a matrix of the runtime execution engine that represents the disjunction of conjunctions query that includes a matrix row for each conjunction included in the query and a matrix column for each database column referenced in an inner predicate in a conjunction;

estimating, for each database column referenced in an inner predicate in a conjunction and based on the set of parameter values, an estimated selectivity of each inner predicate of the disjunction of conjunctions query that references the database column;

aggregating, for each database column referenced in an inner predicate in a conjunction, estimated selectivities of inner predicates of the disjunction of conjunctions query that reference the database column, to generate an aggregated estimated selectivity for the database column;

determining, based on aggregated estimated selectivities of database columns referenced in an inner predicate in a conjunction, a matrix column evaluation order for evaluating inner predicates in the matrix for the disjunction of conjunctions query; and evaluating the disjunction of conjunctions query by evaluating the inner predicates in matrix columns of the matrix based on the matrix column evaluation order and the set of parameter values.

12. The system of claim 11, wherein the disjunction of conjunctions query corresponds to a for-all-entries query.

13. The system of claim 11, wherein the disjunction of conjunctions query comprises a combination of conjunction query expressions joined by multiple disjunction operators.

14. The system of claim 11, wherein the estimated selectivity of a first inner predicate corresponds to a percentage of table rows of the database table that are estimated to match the inner predicate.

15. The system of claim 11, wherein the estimated selectivity of a first inner predicate is determined based on locating a first parameter value in frequency statistic metadata for the database table.

16. A computer program product encoded on a non-transitory storage medium, the product comprising non-transitory, computer readable instructions for causing one or more processors to perform operations comprising:

receiving, at a database system, a query for a database table, wherein the query includes a set of parameter values;

determining that the query corresponds to a disjunction of conjunctions query;

identifying, by a runtime execution engine of the database system, from a pre-compiled query plan, a matrix of the runtime execution engine that represents the disjunction of conjunctions query that includes a matrix row for each conjunction included in the query and a matrix column for each database column referenced in an inner predicate in a conjunction;

estimating, for each database column referenced in an inner predicate in a conjunction and based on the set of parameter values, an estimated selectivity of each inner predicate of the disjunction of conjunctions query that references the database column;

aggregating, for each database column referenced in an inner predicate in a conjunction, estimated selectivities of inner predicates of the disjunction of conjunctions query that reference the database column, to generate an aggregated estimated selectivity for the database column;

determining, based on aggregated estimated selectivities of database columns referenced in an inner predicate in a conjunction, a matrix column evaluation order for evaluating inner predicates in the matrix for the disjunction of conjunctions query; and evaluating the disjunction of conjunctions query by evaluating the inner predicates in matrix columns of the matrix based on the matrix column evaluation order and the set of parameter values.

17. The computer program product of claim 16, wherein the disjunction of conjunctions query corresponds to a for-all-entries query.

18. The computer program product of claim 16, wherein the disjunction of conjunctions query comprises a combination of conjunction query expressions joined by multiple disjunction operators.

19. The computer program product of claim 16, wherein the estimated selectivity of a first inner predicate corresponds to a percentage of table rows of the database table that are estimated to match the inner predicate.

20. The computer program product of claim 16, wherein the estimated selectivity of a first inner predicate is determined based on locating a first parameter value in frequency statistic metadata for the database table.

* * * * *